(12) United States Patent
van Rooij et al.

(10) Patent No.: US 7,779,433 B2
(45) Date of Patent: Aug. 17, 2010

(54) 3D ACTUATOR FOR OPTICAL DISC SYSTEM

(75) Inventors: Joannes Antonius van Rooij, Best (NL); Bart Hendriks, Lommel (NL); Jadranko Dovic, Eindhoven (NL); Bernardus Johannes Stinesen, Eindhoven (NL); Jacobus Cornelis Gerardus van der Sanden, Geldrop (NL); Hendrik Josephus Goossens, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 45 days.

(21) Appl. No.: 12/030,533

(22) Filed: Feb. 13, 2008

(65) Prior Publication Data

US 2008/0204906 A1    Aug. 28, 2008

Related U.S. Application Data

(63) Continuation of application No. 10/516,154, filed as application No. PCT/IB03/02471 on Jun. 4, 2003, now abandoned.

(30) Foreign Application Priority Data

Jun. 4, 2002    (EP) .................... 02077194

(51) Int. Cl.
 *G11B 7/095*    (2006.01)
 *G11B 7/09*    (2006.01)
(52) U.S. Cl. .............. 720/683; 720/685; 369/44.22; 369/44.32

(58) Field of Classification Search ........... 369/44.16, 369/44.22, 44.32, 53.19; 720/683, 685; 359/814, 359/824
See application file for complete search history.

(56) References Cited

U.S. PATENT DOCUMENTS

| | | | |
|---|---|---|---|
| 5,663,840 A | * | 9/1997 | Matsui ................... 359/814 |
| 5,986,983 A | | 11/1999 | Simpson et al. |
| 6,344,936 B1 | | 2/2002 | Santo et al. |
| 2001/0030815 A1 | | 10/2001 | Suh |
| 2002/0006090 A1 | | 1/2002 | Kawano |

FOREIGN PATENT DOCUMENTS

| | | | |
|---|---|---|---|
| DE | 4202297 A1 | | 8/1992 |
| JP | 04301234 A | * | 10/1992 |
| JP | 6124465 A | | 5/1994 |
| JP | 2000195078 | | 7/2000 |
| JP | 2001126278 A | | 5/2001 |
| JP | 2001167458 A | | 6/2001 |
| JP | 2002117562 A | | 4/2002 |
| WO | 03102929 A2 | | 11/2003 |

OTHER PUBLICATIONS

Nagasato et al, "Development of Two-Axis Actuator With Small Tilt Angles for One-Opiece Optical Heads", Japanese Journal of Applied Physics, vol. 35, No. 1B, Jan. 1996, pp. 392-397.

* cited by examiner

*Primary Examiner*—William J Klimowicz

(57) ABSTRACT

An optical pick-up actuator includes a lens holder having tracking and focusing coils which substantially extend in two parallel planes at a side of the lens holder. A magnet system cooperates with the tracking and focusing coils and is arranged separately from the lens holder and extends beyond the planes. The coils are arranged for effecting tilt through cooperation with the magnet system and may be provided at each of two opposite sides of the lens holder.

21 Claims, 14 Drawing Sheets

3D ACTUATOR FOR OPTICAL DISC SYSTEM

The present application is a Continuation Application of U.S. patent application Ser. No. 10/516,154, filed on Nov. 30, 2004, now abandoned, which was PCT filed on Jun. 4, 2003 as PCT International Application No. PCT/IB03/02471 (Published as WO 03/102929) and claims the benefit of European Patent Application No. EP 02077194.5, filed on Jun. 4, 2002, Ser. No. 10/516,154.

FIELD OF THE INVENTION

The invention relates to an optical pick-up actuator comprising a lens holder suspended by suspension means and having tracking and focusing coils, magnets for cooperation with the tracking and focusing coils, an objective lens, and means for tilting the optical lens holder.

The invention also relates to an optical read and/or write system comprising an optical pick-up actuator.

BACKGROUND OF THE INVENTION

Optical pick-up actuators as well as optical read and/or write systems comprising an optical pick-up actuator are known. The actuator comprises a lens holder suspended by suspension means. Tracking and focusing coils on the lens holder in co-operation with magnets on a fixed part allow the lens holder to be moved in a radial direction (tracking) and a vertical direction (focusing). Compared with pick-up actuators that have coils on a fixed part and magnets on the coil holder, this type of actuator is lighter and better able to track and focus. Such an actuator and system is disclosed in US 2001/0030815. In this actuator a means for tilting the lens holder is also provided. A shaft is provided around which the lens holder can be tilted. Tilting, i.e. rotating about an axis, allows an improved control over the movements of the lens holder and consequently an improved correspondence between the optical axis of the lens in the lens holder and the optical medium to be read or to be written. The means for tilting the lens holder known from US 2001/0030815 are, however, rather complicated and thus costly.

SUMMARY OF THE INVENTION

It is an object of the invention to provide an actuator of the type described in the opening paragraph having a relatively simple and effective means for tilting the lens holder.

To this end the actuator is characterized in that the actuator comprises a coil system at a side of the lens holder, said coil system comprising a focusing coil system substantially extending in a first plane and a tracking coil system substantially extending in a second plane parallel to the first plane, the actuator having a magnet system separate from the lens holder extending substantially beyond the first and second plane, seen from the lens holder, said magnet system cooperating with the tracking and focusing coils, the focusing and/or tracking coil systems being arranged for effecting tilt through cooperation with the magnet system.

Present and future designs will make a good focal and/or radial positioning accuracy ever more important, but it is especially the power dissipation that is of great importance. The more dense the information is stored, the more important an active tilt control will become especially in write systems. Too large a power dissipation leads to structural damage or the need for spin down to prevent damage. This problem becomes ever more important as the read/write-speeds increases, and the density of information on the disks increases. With increasing speeds, power dissipation in the actuator becomes ever more important. Too much power dissipation can lead to overheated coils and degradation of the quality of the lens (structural damage). Furthermore, too much power dissipation will increase the system temperature, which can limit the lifetime of the laser(s). To minimize power dissipation, the actuator efficiency should be optimized. The present invention offers a solution to one or more of the above given problems. Minimizing the total mass of the lens holder will increase the efficiency. This is achieved by minimizing the coil mass by means of combining focus, tracking, and tilt functionality in the coil system. A separate tilt coil system is thereby prevented, reducing the mass of the lens holder and the complexity of the design. Tilt functionality may be achieved by combining focusing and tilt, or tracking and tilt, or a combination of focusing, tracking, and tilt functionality. The magnet system is positioned separately from (i.e. not attached to) the lens holder extending substantially, seen from the lens holder, beyond the first and second plane and cooperates with the tracking and focusing coils combined for effecting tracking, tilt, and focusing. Thus the mass of the lens holder is further reduced as compared with lens holders comprising (part of the) magnet system. In general, the advantage of having the coil system combine a focus, radial, and tilt actuator in one plane (or in planes close to each other without iron or magnets in between coils) is that the following can be combined:

1. constant air gap between magnets and coils independent of focus, radial, and tilt stroke; with:
2. very compact design of the lens holder (small in space and mass and consequently with high efficiencies and high resonance frequencies); with:
3. a combined magnet system, which can be of relatively simple design, for instance one single multi-pole magnet or a limited array, for instance one array of 2 pole magnets, for each set of focus, radial, tilt coils. A small magnet volume helps to keep the actuator dimensions small and to minimize the cost. Not having a (part of) the magnet system within the lens holder saves weight of the lens holder, thus increasing the efficiency The lens holder may have a single coil system at one side of the lens holder, in simple and relatively low-cost embodiments, but preferably the lens holder comprises a magnet system separate from the lens holder at opposite sides of the lens holder comprising a focusing coil system (5f, 5/1, 5/2) substantially extending in a first plane (Pcoilf) and a tracking coil system (5r) substantially extending in a second plane (Pcoilr), parallel to the first plane and associated with each of said coil systems, beyond the first and second plane. Such a symmetrical arrangement allows for better accuracy, and on average the current through each coil system will be less, so that the power dissipation is more evenly distributed over the lens holder in comparison with asymmetrical embodiments (coil system at one side of the lens holder only).

Preferably, the first and second plane substantially coincide, i.e. the coil system extends substantially in a planar arrangement. A planar arrangement of the coil system, i.e. an arrangement in which the focus and tracking coils extend substantially in a plane, offers the possibility of a relatively simple design of the lens holder and a high efficiency as compared with designs in which the coils are arranged one behind the other.

Preferably, the combined magnet system comprises an arrangement of sub-magnets, and the magnetic axes of at least some of said sub-magnets have a non-perpendicular orientation in respect of the first and/or second plane of the coils. Such an oriented magnet system, wherein the magnetic axes of at least some of the generated magnetic fields are oriented non-perpendicularly to the planes of the coils, makes it possible to shape the magnetic fields associated with the magnet system so that a higher efficiency is obtained. In such a preferred embodiment, the power dissipation is further reduced and enables a more efficient use of the coils, which could also serve to reduce the number of turns of the coils and/or the extension of the coils, thus reducing the weight of the lens holder. Preferably, the orientation of some of the sub-magnets is in a diagonal direction with respect to the planes of the coils. This makes for a simple design. Use of sub-magnets with non-perpendicular orientation also provides a reduction in residual tilt during tracking and focusing. Residual tilt is unwanted tilt during a tracking or focus movement.

Preferably, at least one of said coil focusing and/or tracking coil systems comprises one or more pairs of coils at each opposite side, wherein said pair(s) of coils forms or form a means for tilting the lens holder. Splitting up at least one of the focus and/or tracking coils into one or more pairs of coils provides a simple design for tilting the lens holder (by offering the coils of the pair a slightly different current). Yet, the planar arrangement of the coil system offers the possibility of a good focus as well as radial efficiency, while the power dissipation needed for a maximum tilt is small, as will be illustrated below.

Preferably, the pair of the coils forming a means for tilting the lens holder is arranged substantially mirror-symmetrically with respect to a mirror plane, through and parallel to an optical axis of the lens holder and substantially perpendicular to the planes of the planar coil arrangements. This allows for a simple and accurate control of the tilt. Preferably, in such arrangements, both focus and tracking coil systems are mirror-symmetrically arranged with respect to said mirror plane, wherein the system forming the means for tilting is arranged at opposite sides of said plane at some distance from the mirror plane, and the other coil system is arranged near the mirror plane. The cross-talk between tilt and tracking and/or focusing is made small thereby.

In preferred embodiments, the focus and the tracking coil systems share a common electrical line. This reduces the number of electrical lines to the coil systems and thus reduces the complexity of the design The coil systems may be composed of wound coils, but in embodiments may also be made by coils printed on a foil. The latter will result in a further reduction of the weight of the lens holder.

It is a further object of the invention to provide an optical read/write system comprising an optical pick-up actuator. To this end an optical read system comprises an optical pick-up actuator in accordance with the invention. The advantages of the optical pick-up improve the functioning of the optical pick-up per se, however, this provides an improvement in the functioning of the optical read system in toto. The possibility of a reduction in power dissipation has a positive effect on the optical read system in toto, since the power dissipated in or near the optical pick-up actuator is dissipated towards other parts of the optical read system, effecting also the proper functioning of said parts.

These and other aspects of the invention are apparent from and will be elucidated with reference to the embodiments described hereinafter.

BRIEF DESCRIPTION OF THE DRAWINGS

In the drawings.

The Figures are not drawn to scale. Generally, identical components are denoted by the same reference numerals in the Figures.

DETAILED DESCRIPTION OF PREFERRED EMBODIMENTS

Figure 1:
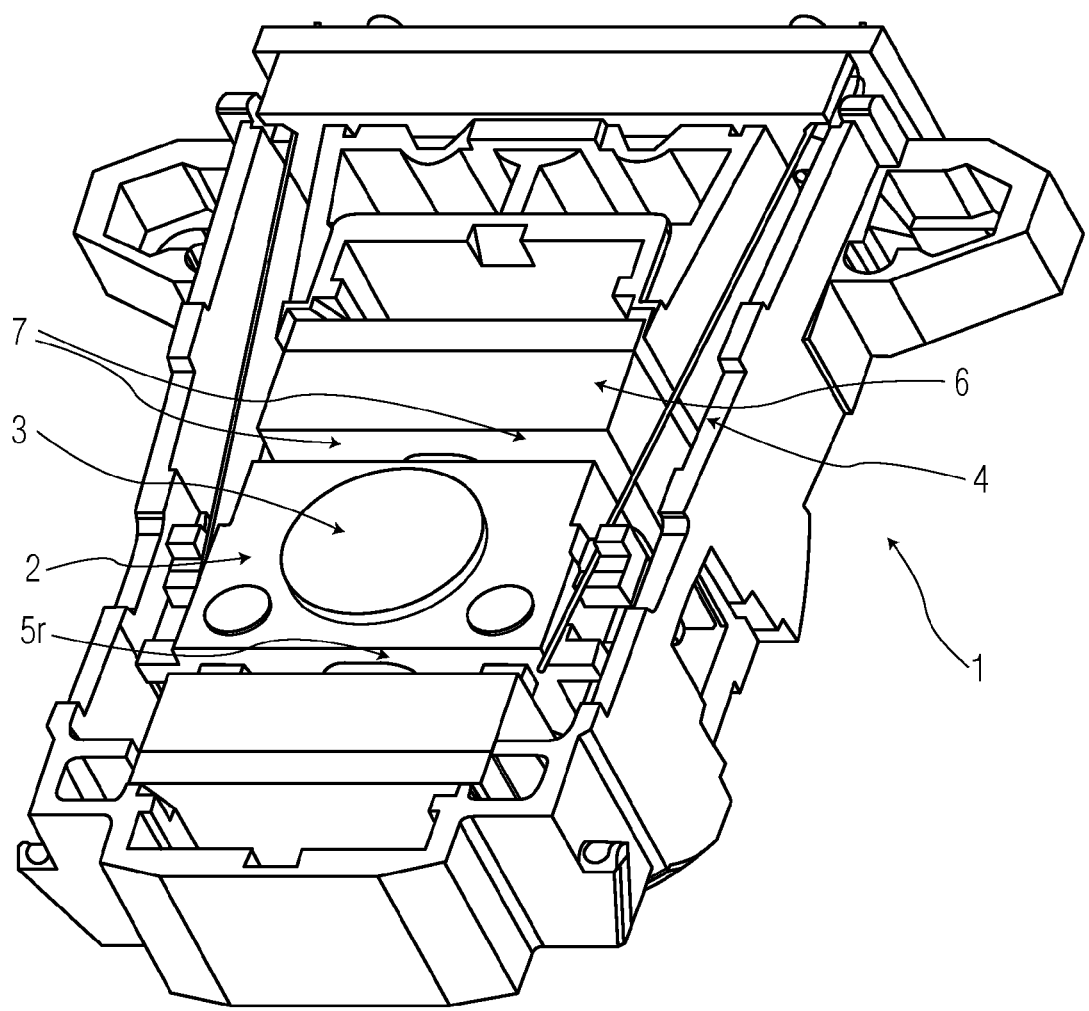
FIG. 1 schematically shows in perspective a pick-up actuator in accordance with the invention.

FIG. 1 shows schematically a pick-up actuator in accordance with the invention. The actuator 1 comprises a lens holder 2 with a lens 3, suspended by suspension means 4. The lens holder 2 comprises a lens system, part of the radial tracking coil 5r of which is shown in FIG. 1. Furthermore, it comprises a fixed part 6 comprising a magnet system 7 for cooperation with the coil system on the lens holder. The coil system and the magnet system which face each other across the gap between the lens holder and the fixed part cooperate so as to effect radial, focus, as well as tilt control. This limits the power consumption in comparison with designs in which a separate tilt control system is used, or lens holders in which magnets in-between coils systems (and thus on the coil holder) are used.

Figure 2:
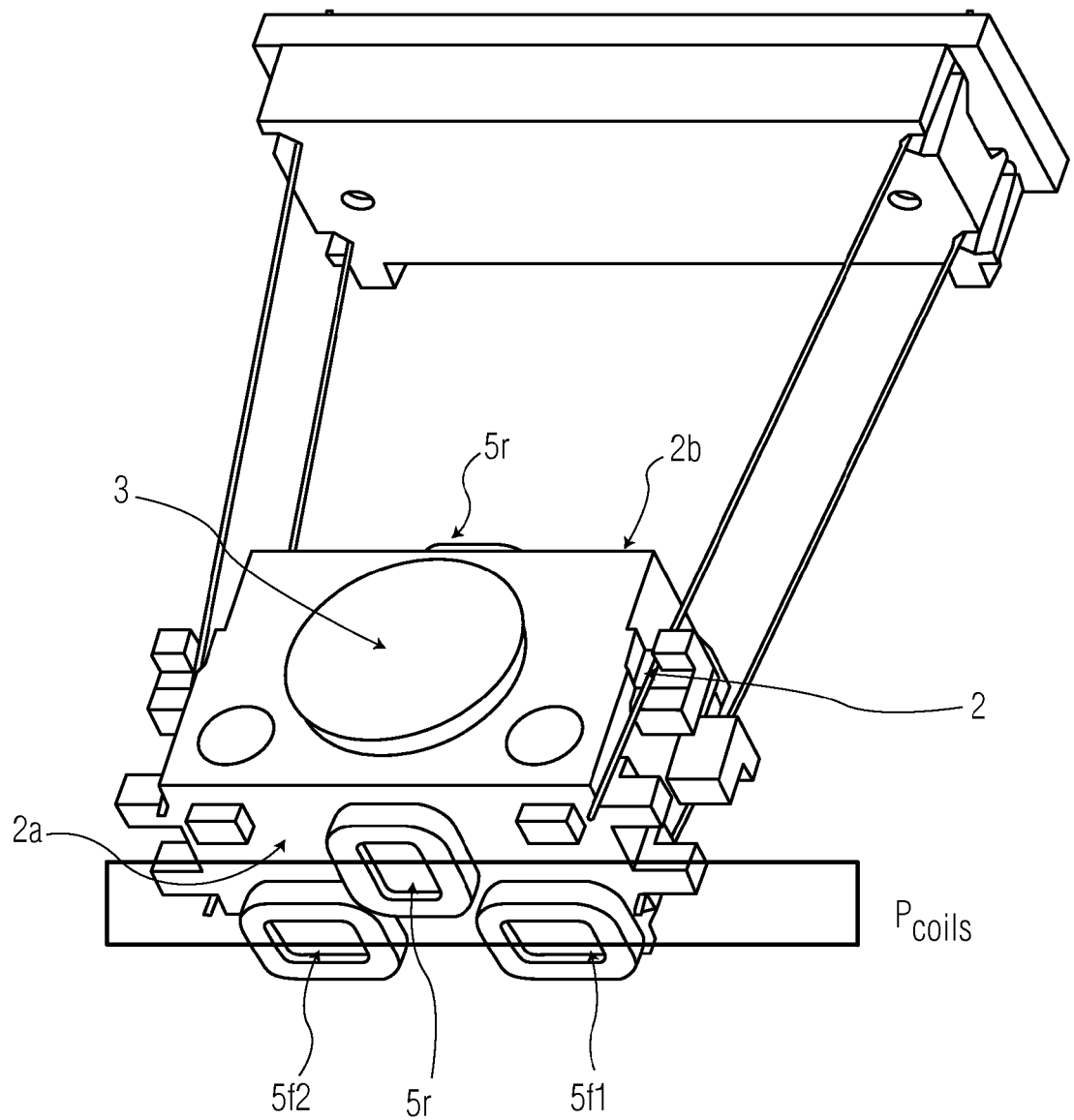
FIG. 2 shows in perspective a detail of a pick-up actuator in accordance with the invention.

FIG. 2 shows in perspective view a detail of the pick-up actuator of FIG. 1. At the opposite sides 2a and 2b of coil holder, a coil system comprising a radial coil 5r (i.e. a coil for correction of the position of the lens holder along the radial direction) is provided, as well as a focus coil system which comprises a pair of coils 5f1 and 5f2. The coil system extends substantially in the plane $P_{coils}$. Naturally the coils 5r, 5f1 and 5f2 will have a width, so the fact that the coils extend substantially in said plane $P_{coils}$ is to be understood in a practical sense, and not to be unduly restricted to a mathematical interpretation of this condition. In this preferred embodiment the tracking and focusing coils extend in a single plane. Within the framework of the invention in the broadest sense, the coils systems may extend in two parallel planes, one system behind the other. Such systems could be used if a relatively large extent of the coils is needed.

Figure 3:
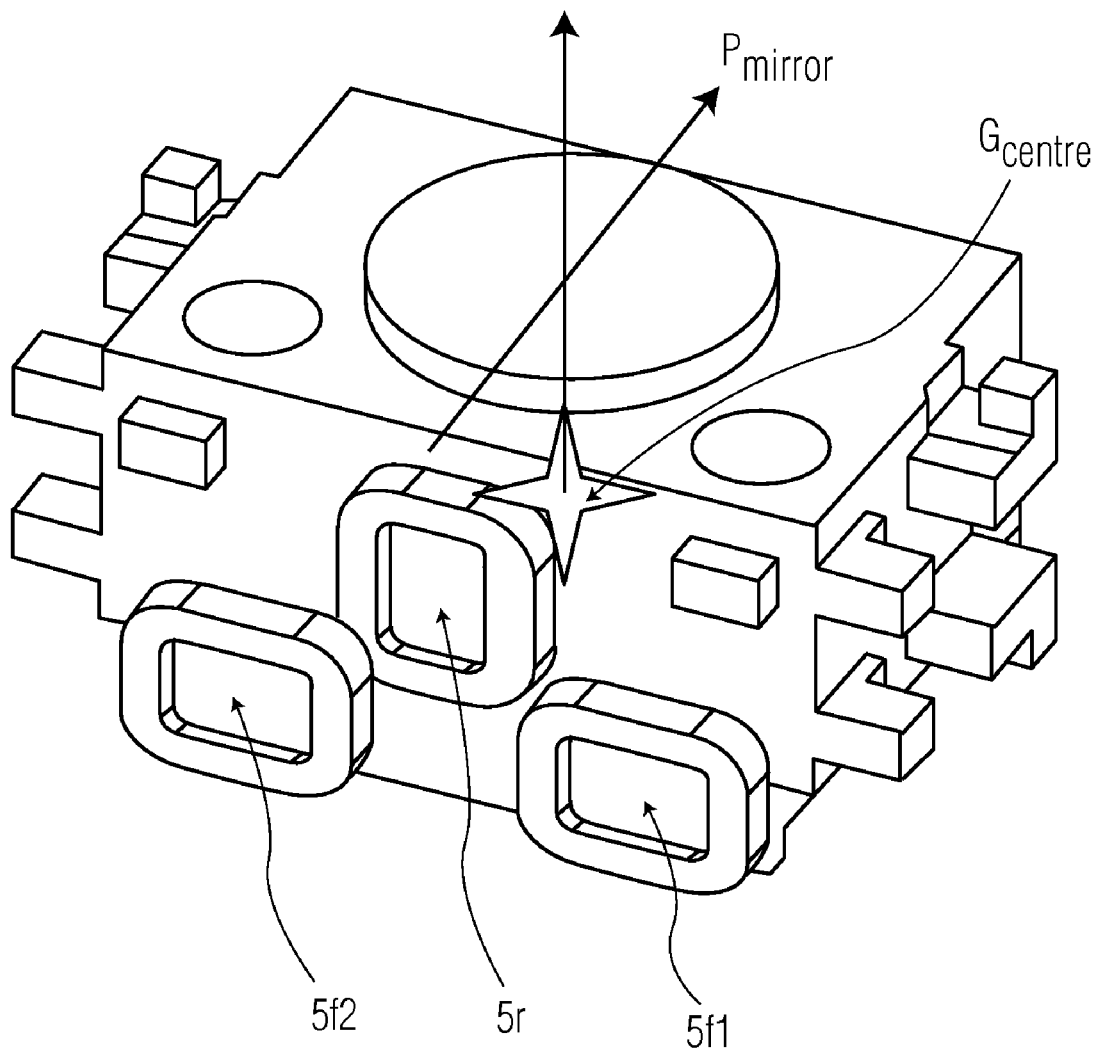
FIG. 3 shows in perspective a lens holder for a pick-up actuator in accordance with the invention.

The advantage of having the coil system combine a focus, radial, and tilt actuator, in one plane (or in planes close to each other without iron or magnets in between coils) is that the following can be combined:

1. constant air gap between magnets and coils independent of focus, radial, and tilt stroke; with:
2. very compact design of the lens holder (small in space and mass and consequently with high efficiencies and high resonance frequencies); with:
3. a relatively simple combined magnet system, for instance one single multi-pole magnet or a limited array, for instance one array of 2 pole magnets, for each set of focus, radial, tilt coils. A small magnet volume helps to keep the actuator dimensions small and to minimize the cost. Not having a (part of) the magnet system within the lens holder saves weight of the lens holder, thus increasing the efficiency FIG. 3 shows schematically a lens holder for an actuator in accordance with the invention. This Figure shows a number of features of preferred embodiments. It shows, for example, a plane defined by an optical axis of the lens (an axis through a center of the lens, substantially perpendicular to the lens) and a direction substantially perpendicular to the sides 2a, 2b of the lens holder. The radial coil system (5r) and the focus coil system (5f1, 5f2) are arranged substantially mirror-symmetrically with respect to this plane. The center of gravity of the lens holder is schematically indicated by the star and lies a small distance below the lens. The focus coil system (5f1, 5f2) lies below this center of gravity in this embodiment, seen in a direction along the focus direction, whereas the radial coil system (or tracking coil system, as it is sometimes called) lies substantially at the same level as the center of gravity. In preferred embodiments, the center of gravity coincides with 2D (focus-track plane) suspension stiffness center. Both the focus coils (5f1, 5f2) and the radial coils (5r) are positioned such that the resulting radial and focus forces are acting through (close to) the center of gravity and 2D stiffness center.

Figure 4A:
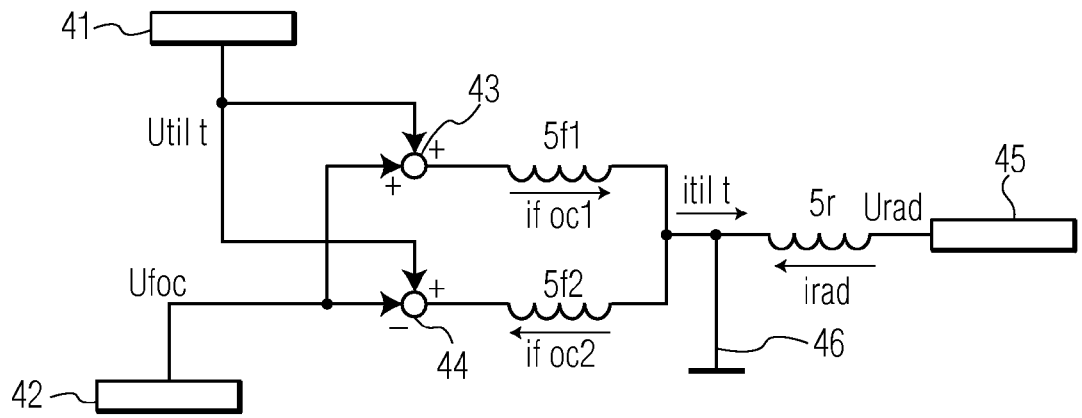
FIGS. 4a and 4b illustrate electrical circuits for an optical read system comprising a pick-up actuator in accordance with the invention.

FIG. 4a illustrates an electrical circuit for an optical read system comprising a pick-up actuator in accordance with the invention. The read/write system comprises a tilt control 41, a focusing control 42, and a radial displacement control 45, which are familiar elements of read/write systems. These detectors generate control signals Utilt, Ufoc and Urad, respectively. Ufoc and Utilt are sent jointly via adders 43 and 44 to the coils 5f1 and 5f2 generating Ifoc1 and Ifoc2. The difference between Ifoc1 and Ifoc2 equals the (effective) tilt current that causes the lens holder to tilt. The sum of Ifoc1 and Ifoc2 equals the (total effective) focus current Ifoc for focus control. Urad is imposed on the radial coil generating Irad for radial control. In this preferred arrangement, the focus and tracking coils system share a common electrical line 46. The total number of electrical lines is then 4, the common line 46, a line for the radial coil, and two lines for the focus coils 5f1, 5f2. Having only four lines needed for correction of radial position, focus, and tilt renders it possible to use the hinges of a simple, commonly used 4-hinge suspension, and the electrical connectors also allow for a simple electrical arrangement.

Figure 4B:
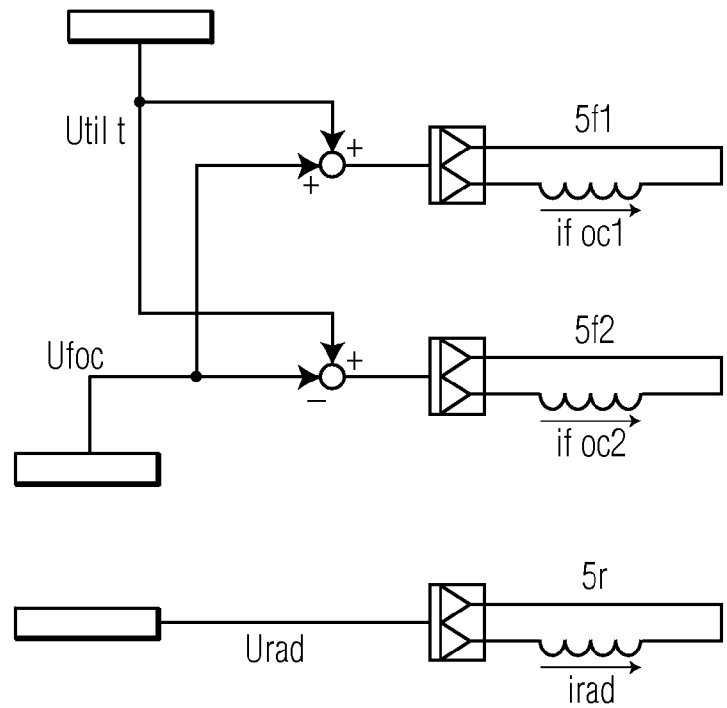

FIG. 4b shows an electrical circuit requiring 6 connectors, which makes it possible to separate the coils (5f1, 5f2, 5r) electrically, preventing electrical cross-talk. Furthermore, this arrangement makes it possible to use simple, straightforward electronic drivers. However, this arrangement will be mechanically more complex and more expensive.

Figure 5A:
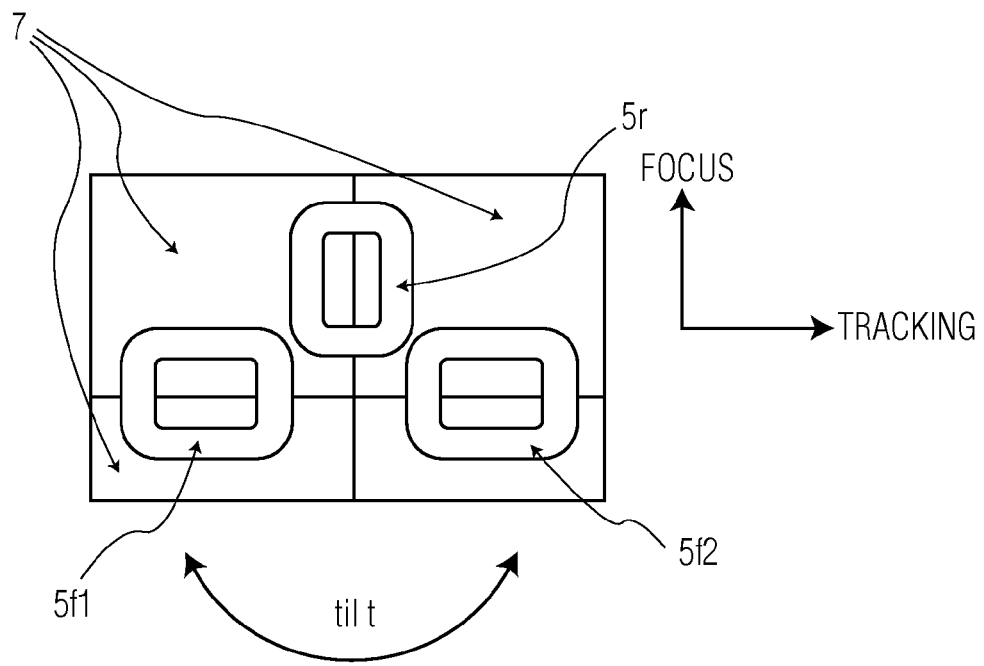
FIGS. 5a, 5b and 5d shows pick-up actuators in accordance with embodiments of the invention in side elevation.

FIG. 5a is a side elevation of a lens holder with the radial coil 5r and the focus coils 5f1 and 5f2. Also shown are the magnets 7. Sending a current through the coil 5r will shift the lens holder in the radial direction rad, whereas a sum of the currents through the coils 5f1 and 5f2 will shift the lens holder along the focus direction foc, a difference in currents between the coils 5f1 and 5f2 causing the lens holder to tilt, as indicated by the arrow 'tilt' in FIG. 5a.

Figure 5B:
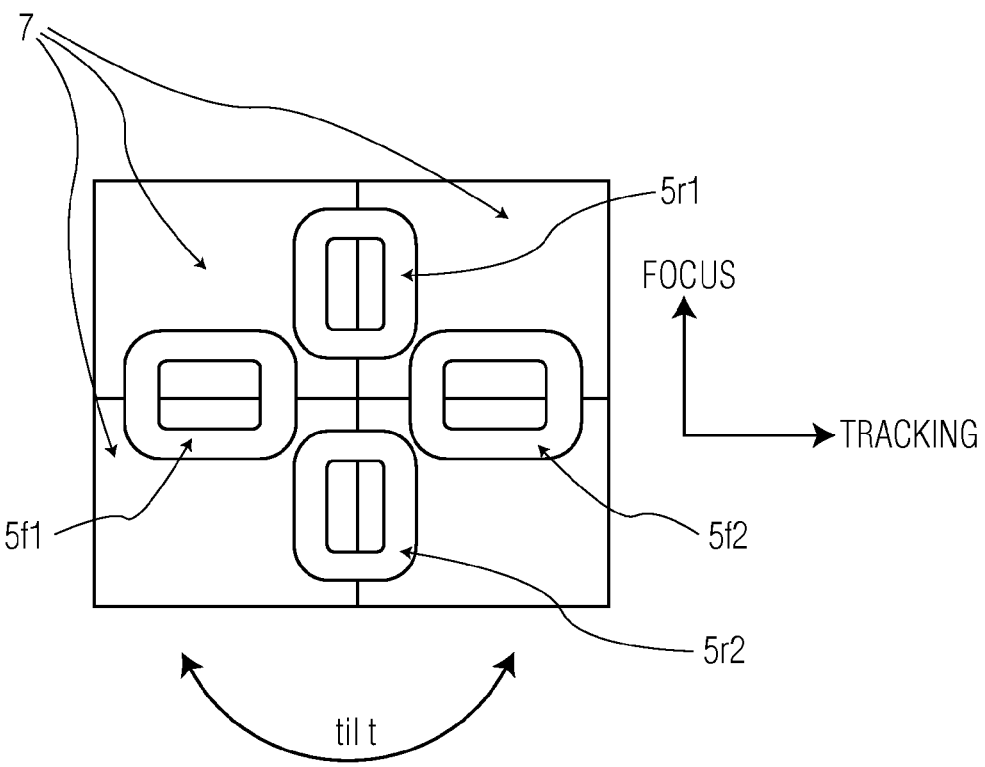

FIG. 5b is a side elevation of a lens holder with radial coils 5r1 and 5r2 and focus coils 5f1 and 5f2. Also shown are the magnets 7. Sending a current through the coils 5r1 and 5r2 will shift the lens holder in the radial direction, whereas a sum of the currents through the coils 5f1 and 5f2 will shift the lens holder along the focus direction, a difference in currents between the coils 5f1 and 5f2 causing the lens holder to tilt along a vertical axis, as indicated by the arrow 'tilt' in FIG. 5a. With this arrangement it is also possible to tilt (by sending slightly different currents through coils 5r1 and 5r2) to effect a 'tilt' along a horizontal axis.

Figure 5C:
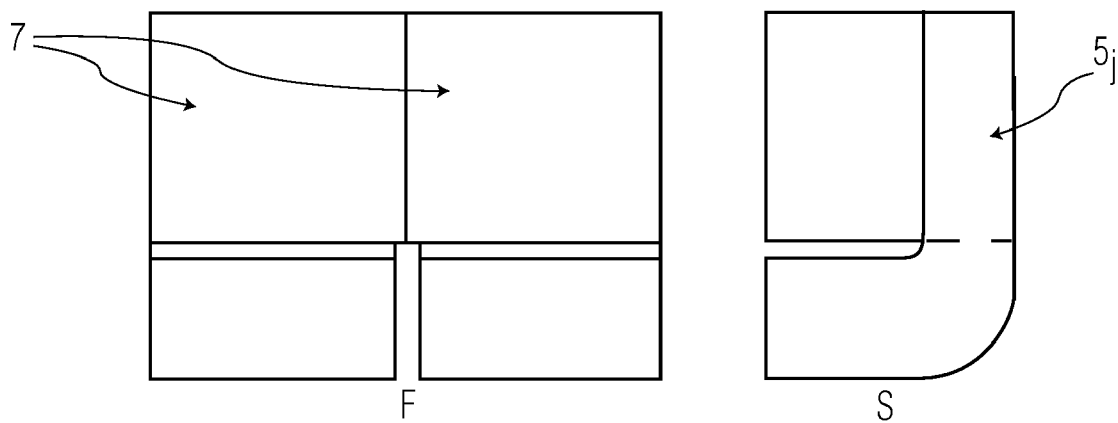
FIG. 5c is a side elevation of a magnet system for an actuator.

FIG. 5c shows a magnet system 7 with a yoke 5j at the rear side of the magnet system in front elevation (F) and side elevation (S). Such yokes enable the magnetic field to be enhanced and modified (directed in certain directions).

Figure 5D:
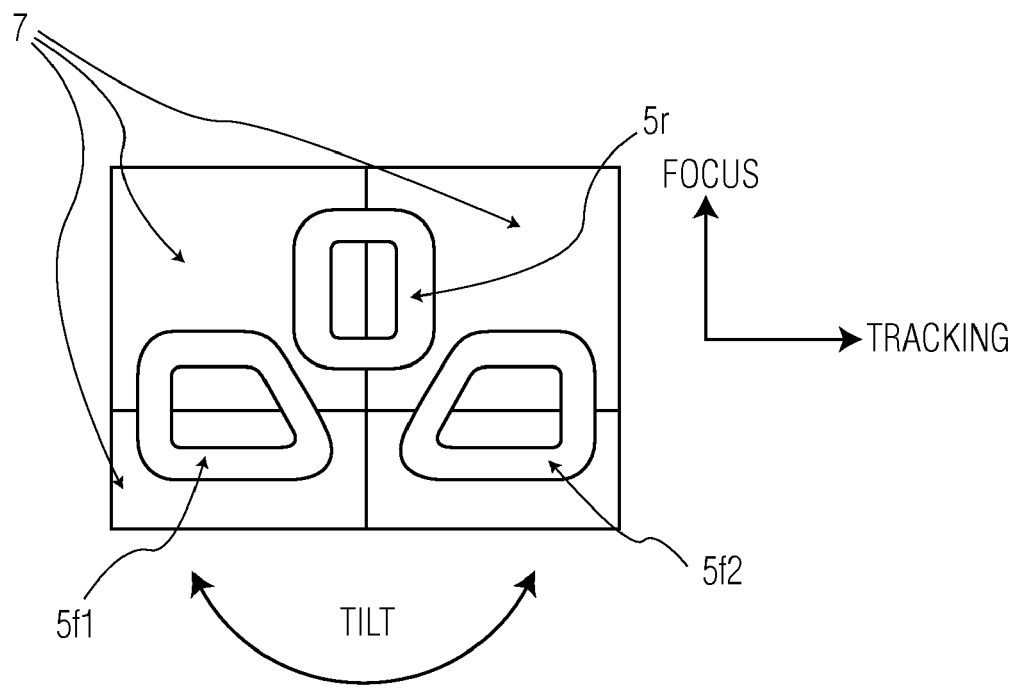

FIG. 5d shows an arrangement which is in effect a variation of the arrangement shown in FIG. 5a. The coils 5f1 and 5f2 are slightly elongated below the coil 5r. Such an arrangement allows coils 5f1 and 5f2 to cover a larger area, thus improving efficiency (because they are slightly larger) and reducing the current need and power consumption, or with the same power consumption allowing for a larger maximum shift or tilt.

Figure 6A:
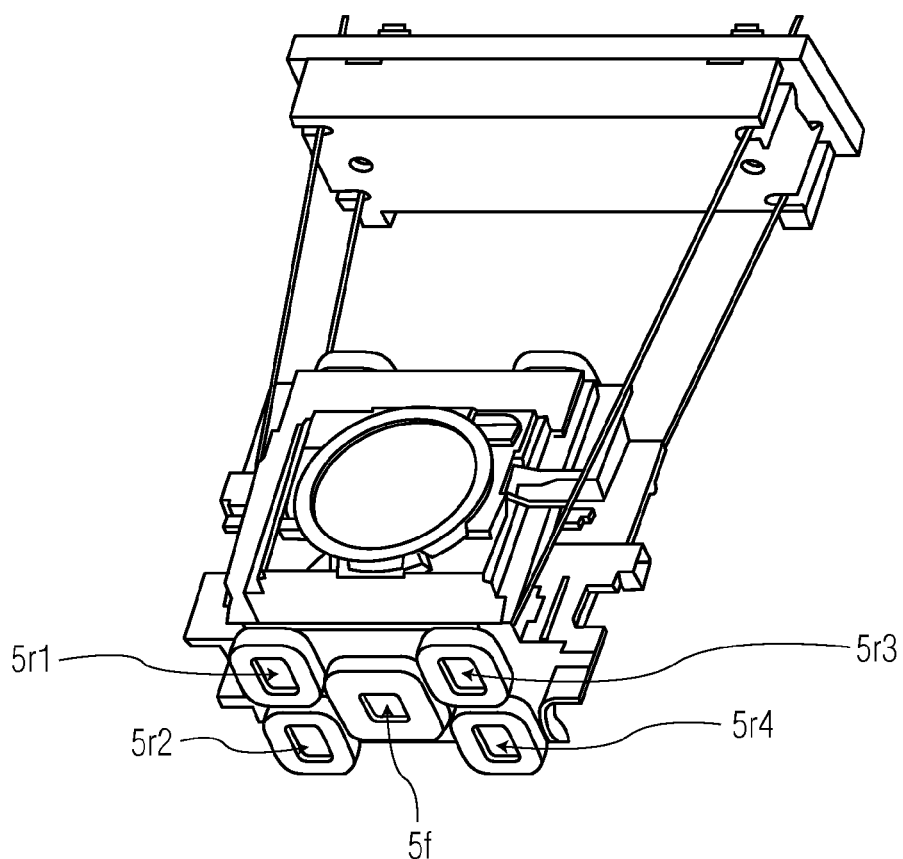
FIGS. 6a and 6b show an embodiment (the H-variant) of the invention.
Figure 6B:
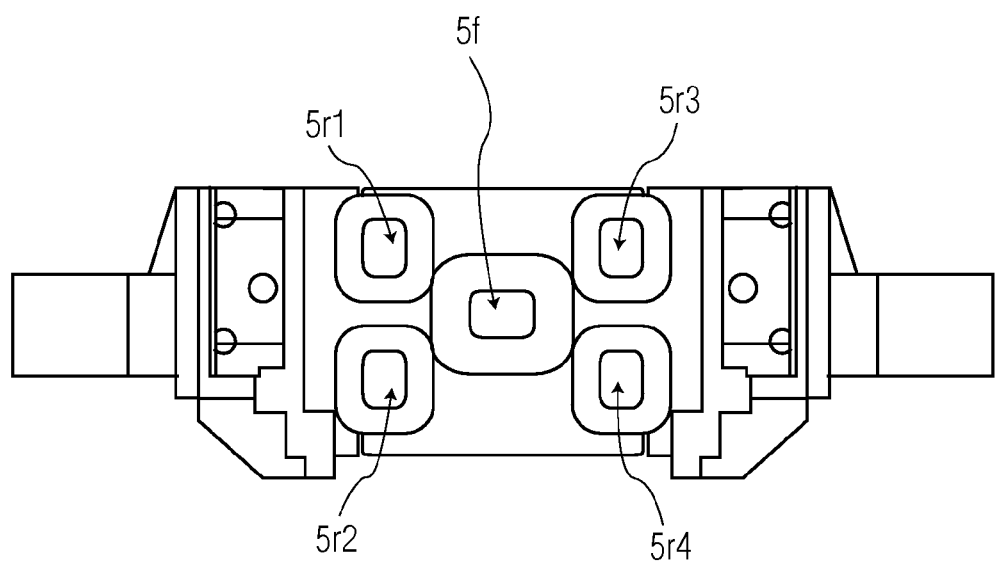

FIGS. 6a and 6b also show an embodiment of the actuator in accordance with the invention. In this case the radial coils (5r1, 5r2, 5r3, 5r4) are split up, taking care of both radial and tilt control. The single focus coil (5f) is just for focus control. In this example the radial coils 5r1 and 5r3 are put in series, as are the coils 5r2 and 5r4.

In the embodiments shown in FIGS. 1 to 5a and 5d, the arrangement of the coil system can be seen as constituting a 'T' arrangement where coils 5f1 and 5f2 form one part of the 'T' and the coil 5r the other part. The arrangement of FIGS. 6a and 6b looks more like an H, wherein coils 5r1 to 5r4 constitute the two legs of the H, and coil 5f the crossbar. In this arrangement it is the focus coil which is not split, whereas the tracking or radial coil 5r is split up into two pairs of coils. In this example the coils 5r1 and 5r3 are put in series, as are the coils 5r2 and 5r4. A current common through all coils 5r1 to 5r4 will effect a radial shift, a difference in current between 5r1-5r3 and 5r2-5r4 will cause a difference in radial shift between the top part and the bottom part of the lens holder, thus resulting in a tilt.

Yet another embodiment is formed by translating coil 5f downwards, in which case the coils form a U (the coils 5r1 to 5r2 forming two legs of the 'U', the coil 5f the bottom of the 'U').

Figure 7:
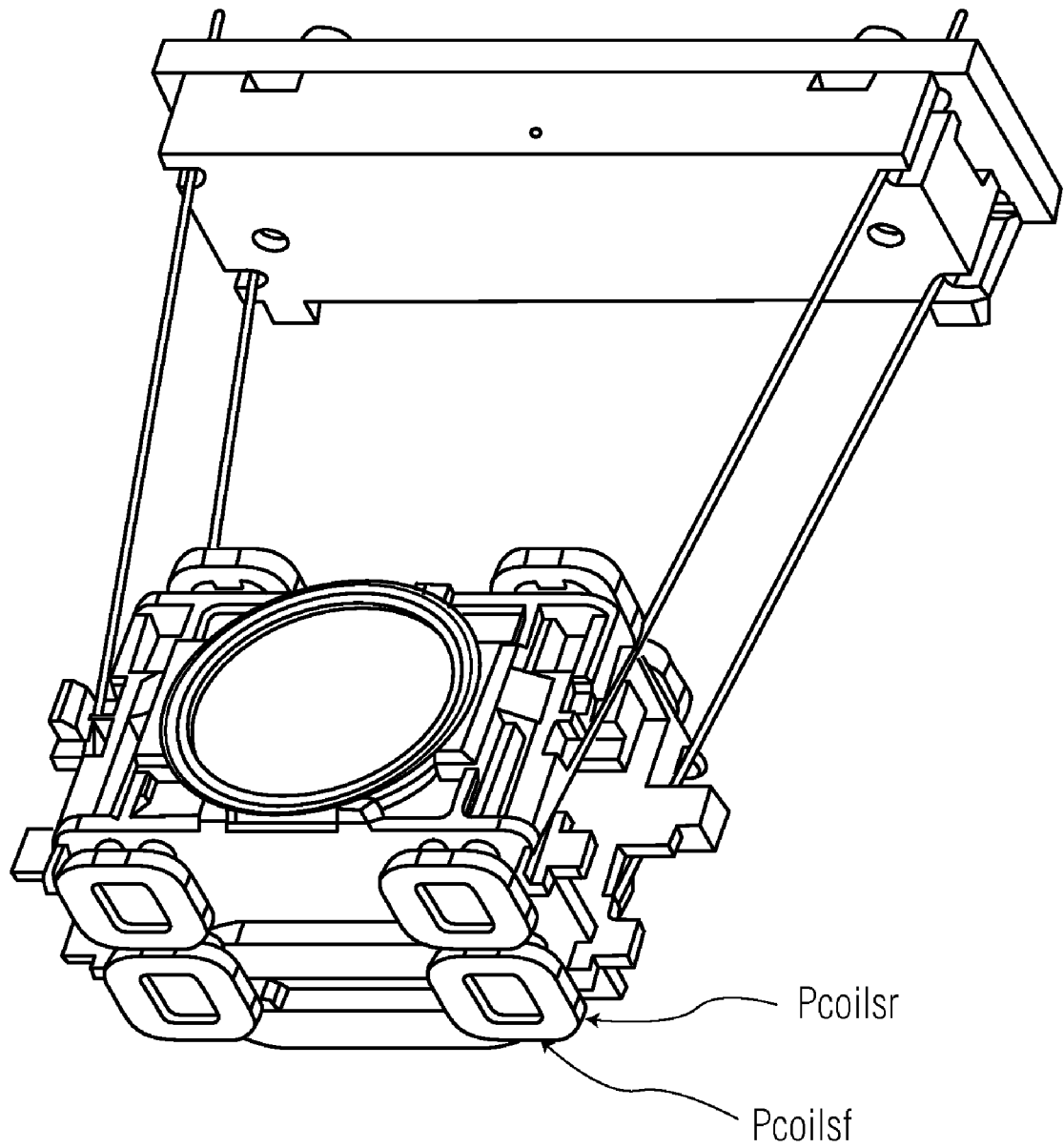
FIG. 7 shows an embodiment of the invention in which the focus and tracking coils extend one behind the other, i.e. in parallel separate planes.

In the above embodiments, all coils (system 5r and 5f) are arranged in a planar arrangement, i.e. the coils extends in a plane $P_{coils}$. Within the framework of the invention in the broadest sense, the coils systems may extend in two parallel planes, one system behind the other. Such systems could be used if a relatively large extent of the coils is needed. To investigate the effect of the planar arrangement feature, the inventors have made designs in which one coil system was positioned behind the other system (seen from the lens holder), and in which either the focus coils or the rad coils were split to effect tilting. FIG. 7 shows such a system (for the U-form) in which the focus coils are nearer to the holder than the radial coils, or in other words, the radial coils are nearest to the magnets. The radial (tracking) coil system extends in a first plane Pcoilr and the focusing coil system extends in a second, parallel plane Pcoilf. In the embodiments of FIGS. 1 to 6, the parallel planes Pcoilr and Pcoilf substantially coincide. Putting a set of coils farther away from the magnets will results in a lower K-factor (linear motor constant [N/A]), but this embodiment makes it possible to build the lens holder more compact (and maybe also reduce its weight).

Figure 8:
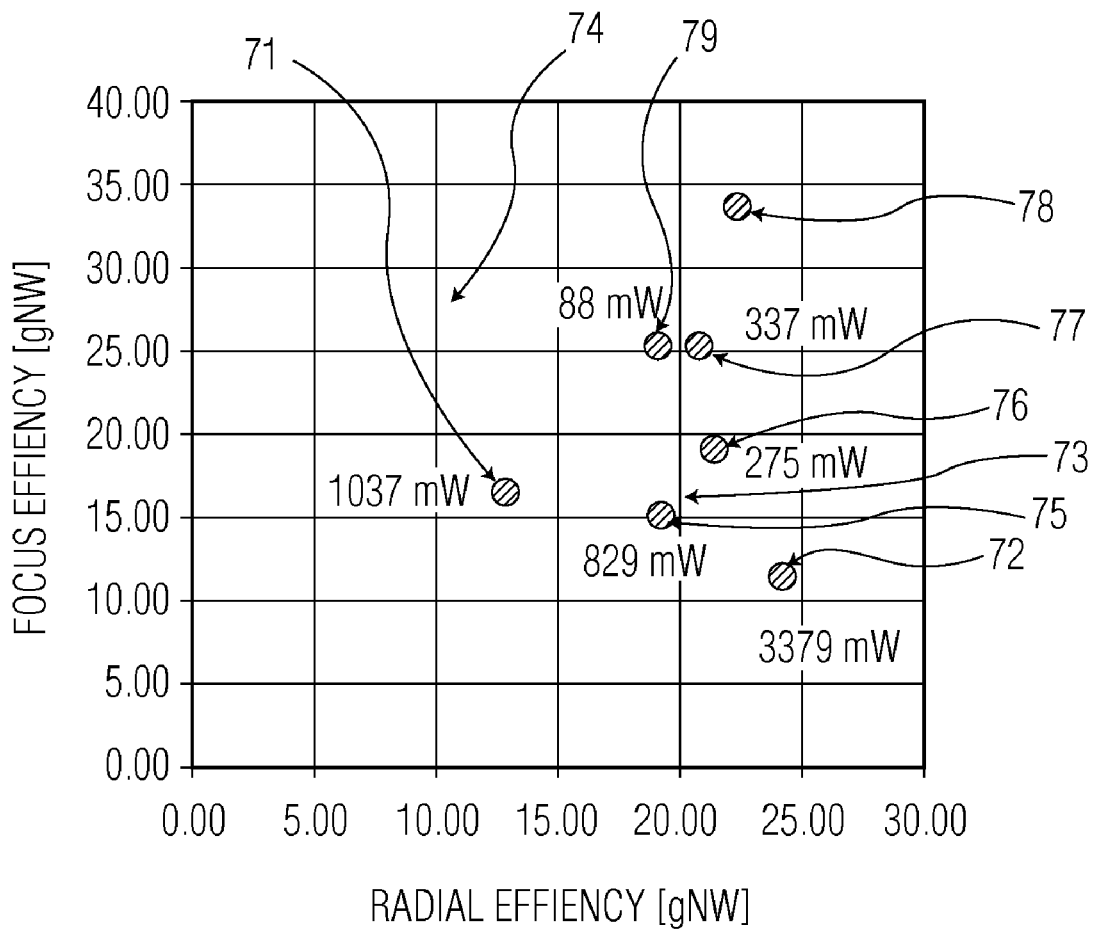
FIG. 8 illustrates in a graphical form the efficiency of actuators in accordance with several embodiments of the invention.

The efficiencies of various embodiments which are all designed within the same, specific space boundaries are given in FIG. 8. The vertical axis denotes focus efficiency, the horizontal axis the radial efficiency, and the data in mW next to the points give the power dissipation in milliwatts for 8 mrad tilt. The points are respectively:

71: U form, focus coil split, focus coil nearest to magnet
72: U form, focus coil split, radial coil nearest to magnet (as in FIG. 7)
73: U form, radial coil split, radial coil nearest to magnet
74: U form, radial coil split, focus coil nearest to magnet
75: U form, radial coil split, all coils in planar arrangement
76: H form, radial coil nearest to magnet
77: H form, all coils in planar arrangement (as in FIGS. 6a, 6b)
78: as 77, but with inner yoke (will be further explained below)
79: T form, all coils in planar arrangement (as in FIGS. 1-5)

What is preferred is a low value for the tilt dissipation (preferably below 100, more preferably below 200 mW), combined with high values for both the focus efficiency and the radial efficiency. The designs that give such values are 75, 76, and 77 to 79, especially 77 to 79, with the best result for design 79. Thus it follows that:

1. designs in which all coils are positioned in a planar arrangement (Pcoilf substantially coinciding with Pcoilr) generally give better results than designs in which the coil are positioned one behind the other in terms of efficiency, provided the rest of the design remains unchanged,
2. The H- and the T-form are preferred to the U-form,
3. The T-form gives the best results.

While the invention has been described in connection with preferred embodiments, it will be understood that modifications thereof within the principles outlined above will be evident to those skilled in the art, and thus the invention is not limited to a single or any one of the preferred embodiments but is intended to encompass such modifications.

Figure 9:
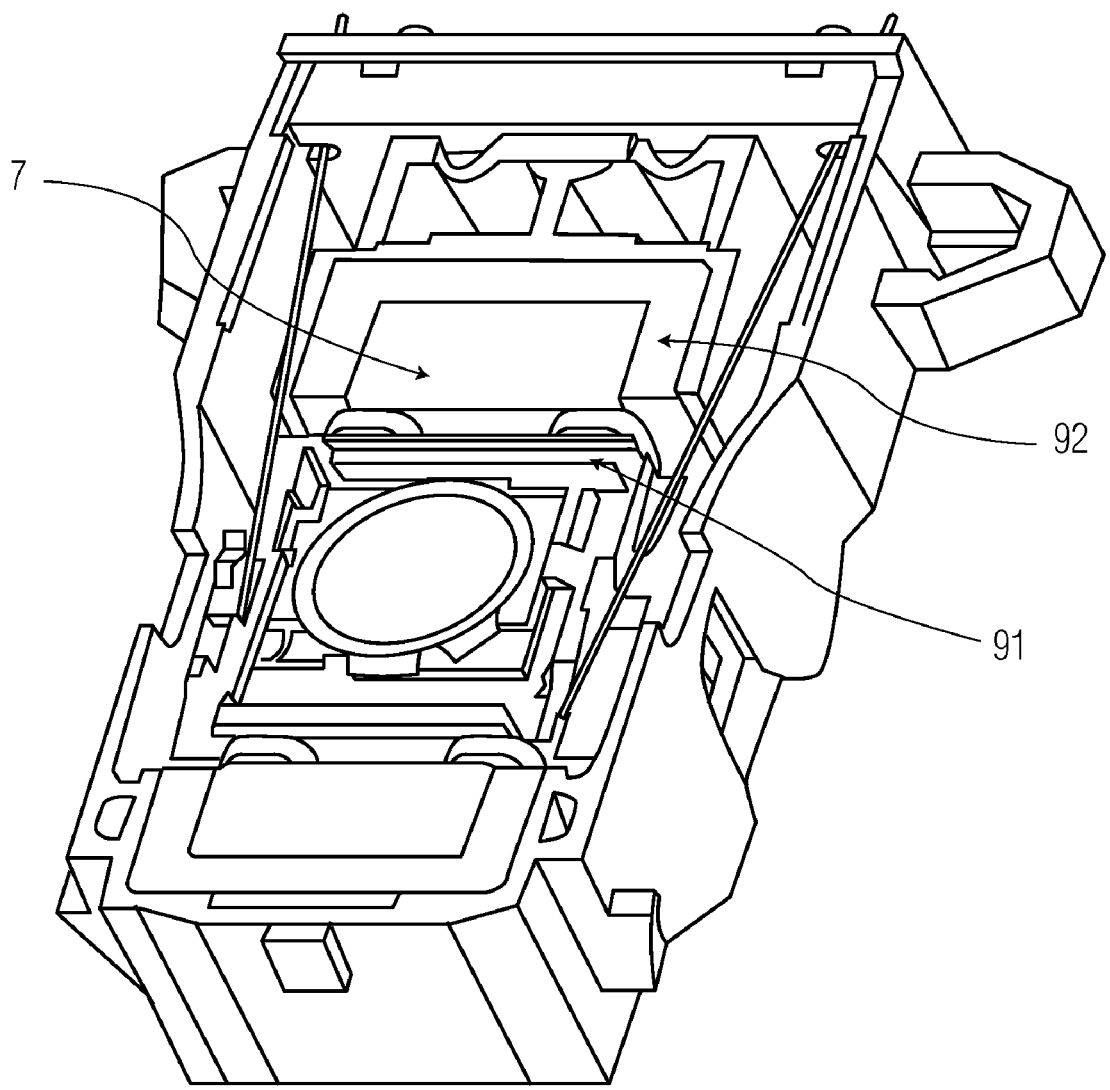
FIG. 9 illustrates embodiments of the invention having yokes.

One such modification is shown, for example, in FIG. 9. The actuator shown is similar to the actuator having the coil system in H-form as shown in FIGS. 6a and 6b, except for the fact that a yoke (a piece of metal with a high magnetic permeability µ) is placed behind the coils extending in a slit in the holder, the yoke itself being attached to a fixed part, i.e. not to the lens holder. This increases and directs the magnetic fields generated by the focus and tracking coils, which as a consequence reduces the needed currents and thus the power dissipation, which becomes apparent when the power dissipations of points 77 (H-form without yoke) and 78 (H-form with yoke) are compared. The yoke will require a larger and more complex lens holder owing to, for example, the provision of the slit and may thus increase the weight of the lens holder, but on the other hand it will also increase the efficiency and make it possible to reduce the weight and/or extent of the coils.

In a preferred embodiment, the combined magnet system 7 comprises an arrangement of sub-magnets, the magnetic axes of at least some of said sub-magnets having a non-perpendicular orientation to the first and/or second plane. Such an oriented magnet system, wherein the magnetic axis of the magnetic fields is non-perpendicularly oriented to the planes of the coils, makes it possible to shape the magnetic fields associated with the magnet system such that a higher efficiency is obtained. This reduces the power dissipation and renders possible a more efficient use of the coils, which could also be employed to reduce the number of turns of the coils and or the extension of the coils, thus reducing the weight of the lens holder.

Figure 10A:
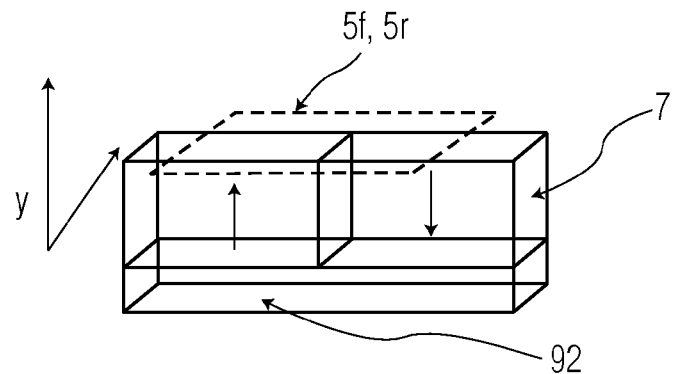
FIGS. 10a to 10c illustrate a specific arrangement for the magnet system in accordance with a preferred embodiment of the invention.
Figure 10B:
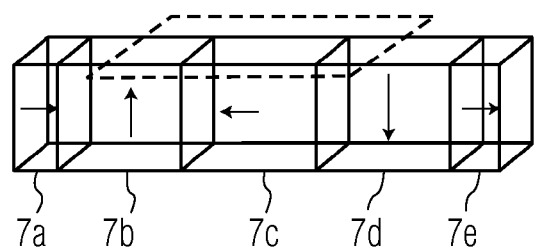
Figure 10C:
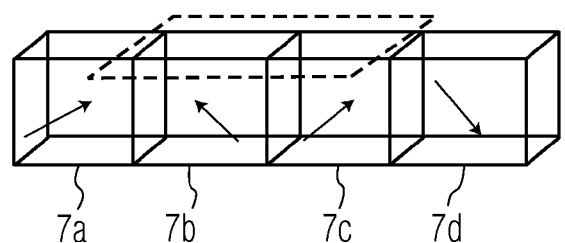

FIGS. 10a to 10c illustrate such a magnet arrangement.

Small electromagnetic actuators conventionally comprise, as is schematically shown in FIG. 10a, two permanent magnets 7 magnetized oppositely and perpendicularly to the upper surface facing the coil 5r 5f, together with an optional yoke 92. The magnets and the yoke together form a stator. The rotor is formed by the coil 5r, 5f (denoted by the dotted line) through which a current flows that interacts with the magnetic field in the y-direction (By) to generate a Lorentz force in the x-direction. The field generated by such a pair of magnets is, however, not optimal. There is a need to increase the efficiency of the actuator. In order to increase the efficiency in embodiments of the invention, the magnet system comprises sub-magnets with an orientation that is non-perpendicular.

FIG. 10b gives one possible arrangement. In this arrangement two sub-magnets 7b and 7d with perpendicular magnetic field orientation are separated by a magnet 7c with a parallel orientation and flanked at both sides by magnets 7a and 7e. The magnetic field is perfectly symmetrical and better optimized than the field generated by the arrangement shown in FIG. 10a. The concept, although within the scope of the preferred embodiments, does require 5 magnets and thus a relatively large space.

FIG. 10c gives a more preferred arrangement, using only 4 magnets. This is a simpler design requiring less space, and calculations have shown that the magnetic field is even better than that of the arrangement shown in FIG. 10b.

The arrangement of FIG. 10c may be used in several embodiments,

The magnet array 7a to 7d may be double-sided,

The magnet array may be combined with a yoke, analogous to the yoke shown in FIG. 10a, The magnets 7a to 7d may be made in (slightly) different sizes. Smaller inner magnets 7b and 7d lead to the possibility of using a smaller coil and therefore a smaller moving mass, leading to increased efficiency.

Figure 11:
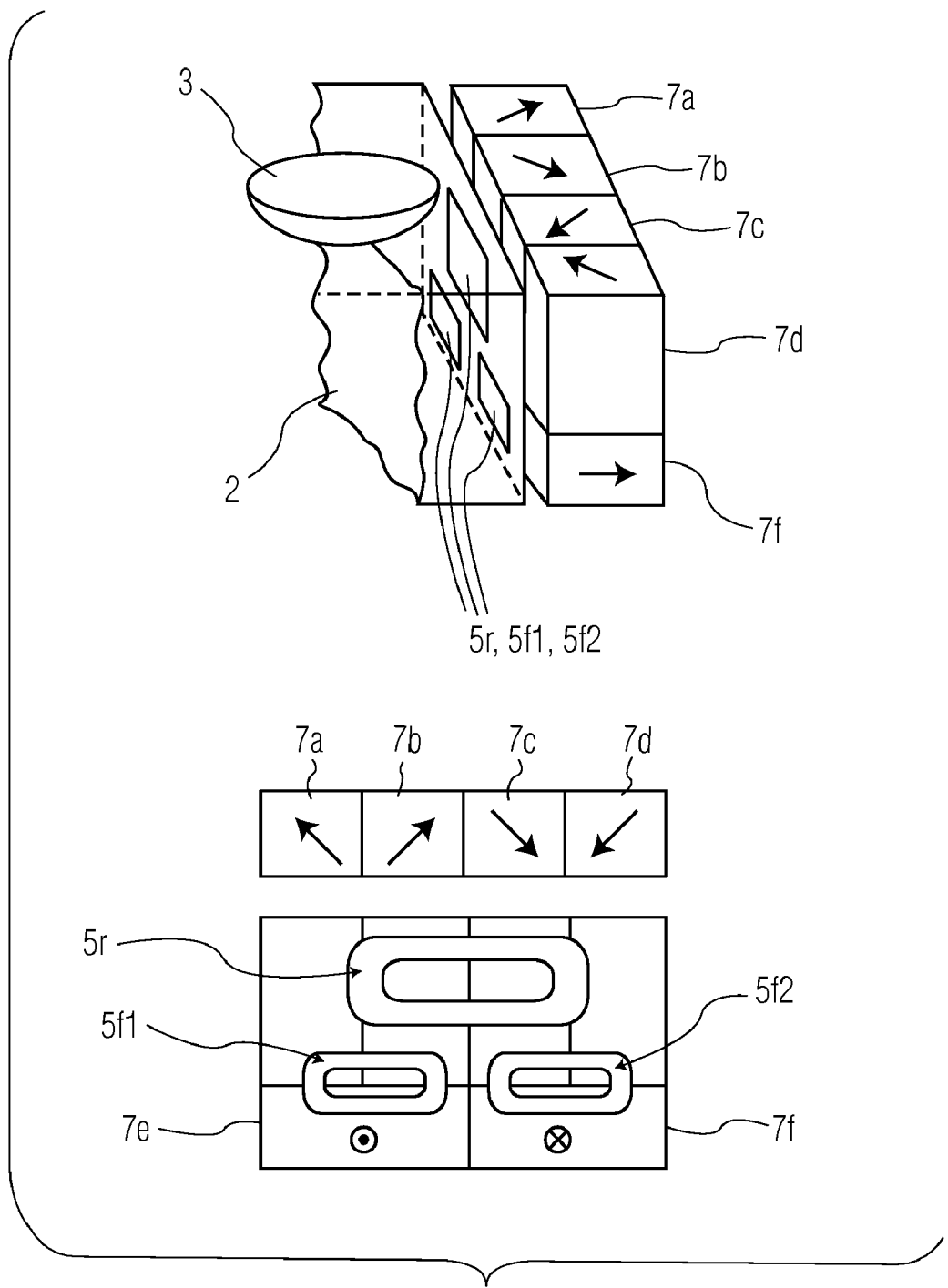
FIG. 11 illustrates an actuator in which use is made of the magnet systems illustrated in FIG. 10.

FIG. 11 shows the concept of the arrangement schematically shown in FIG. 10c to improve the efficiency of the actuator. The upper half of the magnet array comprises four magnets diagonally magnetized as shown in the plan view. The two bottom magnets are perpendicularly magnetized. Comparison of such a design with a design in which there are two perpendicularly magnetized upper magnets (instead of the four diagonally magnetized magnets as in FIG. 11) show a remarkable increase in efficiency: the motor constant (ratio of force to current) has increased by 50% while the acceleration efficiency (ratio of acceleration to square root of electrical power) has increased by 25%.

Furthermore, residual tilt (i.e. a small residual tilt during tracking and/or focusing movement) is reduced, and the linearity of the movements (i.e. the relation between the current and the movement) is improved. Both of these effects make control of the movements easier.

The invention is embodied in each new characteristic and each combination of characteristics. Any reference signs do not limit the scope of the claims. The word "comprising" does not exclude the presence of other elements than those listed in a claim. Use of the word "a" or "an" preceding an element does not exclude the presence of a plurality of such elements. The Figures and embodiments are shown by way of example and do not restrict the scope of the claims. For example, where in the Figures the coils are wound on the holder, in embodiments the coil may be printed or otherwise provided on a foil.

Further advantageous embodiments are, for example, those in which the magnet system as shown in FIGS. 10a to 10c (the arrangement of sub-magnets) is used in combination with an asymmetric coil arrangement (i.e. a coil system at one side of the lens holder only). The increased efficiency offered by the sub-magnet arrangement gives the possibility of using smaller coils and/or less current, thereby reducing power dissipation and any unevenly distributed weight.

It is also advantageous to use the magnet system as shown in FIGS. 10a to 10c in combination with embodiments in which the first and the second plane do not coincide (i.e. the focusing and tracking coils are positioned one (partly) behind the other). The magnetic fields generated by the sub-magnet arrangement are more directed towards the coils and have on average a greater extent in the direction of the coils. This is of advantage if one of the coils is further away from the magnet system than the other.

Figure 12:
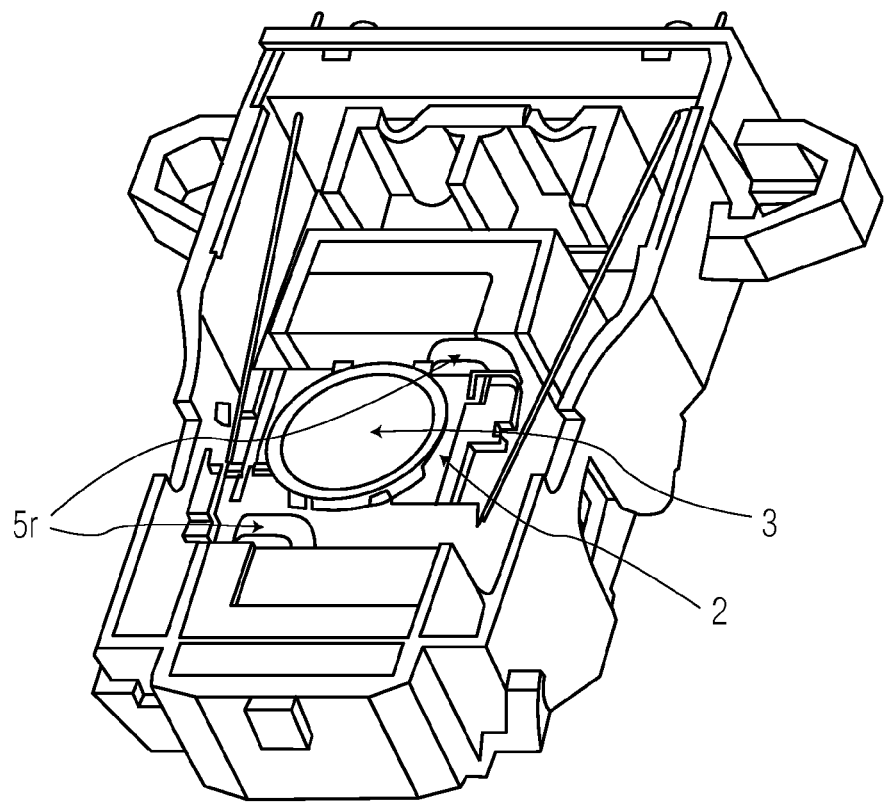
FIGS. 12 to 14 illustrate a further example of a device in accordance with the invention.
Figure 13:
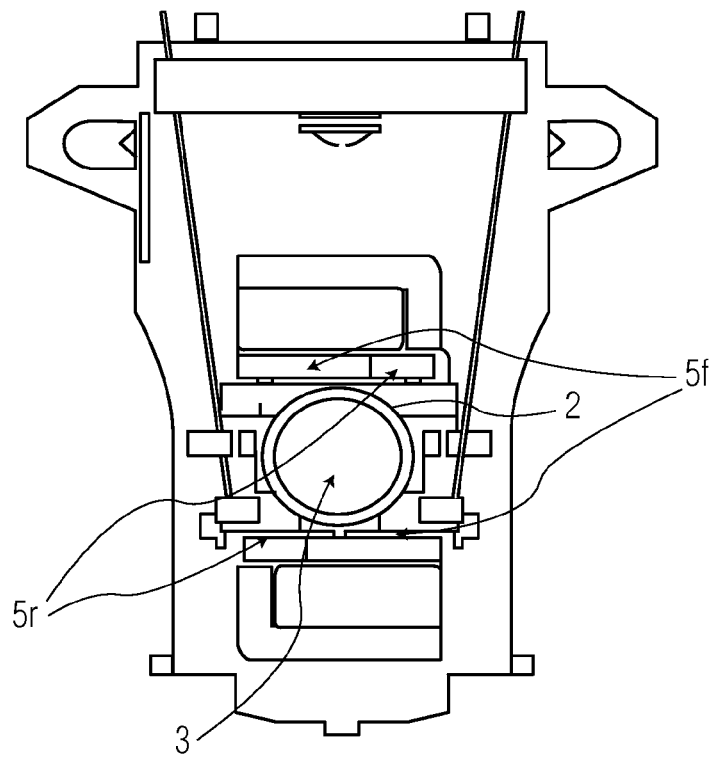
Figure 14:
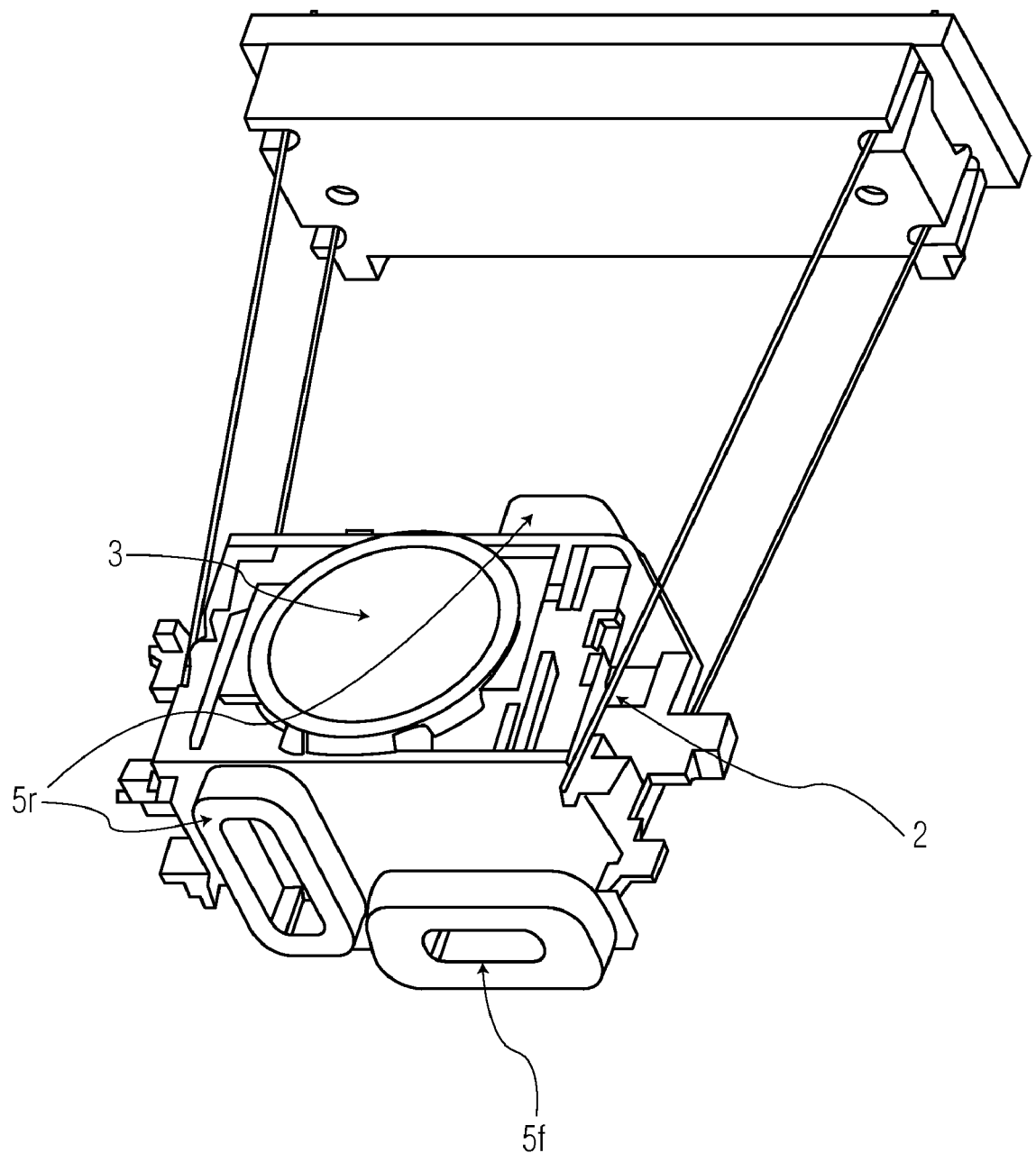

FIGS. 12 to 14 illustrate a further example in which the holder 2 with lens 3 has coils 5r and 5f at both sides. Neither of these coils is split, but the configuration of the coils (more or less forming an L, with one of the coils being the I of the L and the other one being the _ of the L), forming an L at one side of the holder and an ⌋ at the other side, enables the 5r and 5f coils to effect tilt in cooperation. In this example, therefore, it is the focusing and the tracking coil systems together which are arranged for effecting tilt through cooperation with the magnet system.

The invention may be briefly described as follows:

An optical pick-up actuator has a lens holder. The lens holder has tracking and focusing coils which substantially extend in two parallel planes at a side of the lens holder. A magnet system is arranged separately from the lens holder and extends beyond said planes, said magnet system cooperating with the tracking and focusing coils, the coil systems being arranged for effecting tilt through cooperation with the magnet system.

Preferably, a coil system is provided at each of two mutually opposed sides of the lens holder.

The invention claimed is:

1. An optical pick-up actuator comprising a lens holder suspended by suspension means and having tracking and focusing coils and an objective lens, and means for tilting the optical lens holder, wherein the actuator comprises a coil system at a side of the lens holder,
   said coil system comprising a focusing coil system and a tracking coil system, the tracking coil system including a first tracking coil in a first plane and a second tracking coil in a second plane substantially parallel to the first plane,
   the actuator having a magnet system separate from the lens holder and extending substantially beyond the first plane and the second plane, seen from the lens holder, said magnet system cooperating with the tracking and focusing coils, the focusing and tracking coil systems being arranged for effecting tilt through cooperation with the magnetic system
   wherein the focus coil system lies below the center of gravity of the optical lens holder, and
   wherein the tracking coil system lies substantially at the same level as the center of gravity of the optical lens holder.

2. The optical pick-up actuator as claimed in claim 1, wherein magnetic axes of at least some of sub-magnets of the magnetic system have a non-perpendicular orientation relative to the first and/or the second plane of the coils.

3. The optical pick-up actuator as claimed in claim 1, wherein a pair of the coils forms the means for tilting the lens holder and forms part of the focus coil system.

4. The optical pick-up actuator as claimed in claim 1, wherein the tracking and focusing coil systems share a common electrical line.

5. An optical read and/or write system comprising an optical pick-up actuator according to claim 1.

6. The optical pick-up actuator of claim 1, wherein the focusing coil system includes a first focusing coil in the first plane and a second focusing coil in the second plane, and wherein the first focusing coil is substantially diagonal to the second focusing coil.

7. The optical pick-up actuator of claim 1, wherein the first tracking coil and a first focusing coil form an L configuration in the first plane, and wherein the second tracking coil and a second focusing coil form an ⌋ configuration in the second plane.

8. An actuator comprising:
   a lens holder having a tracking coil system and a focusing coil system; and
   an objective lens held by the lens holder;
   a means for tilting the lens holder;
   wherein the tracking coil system includes a first tracking coil in a first plane and a second tracking coil in a second plane substantially parallel to the first plane, and wherein the first tracking coil is substantially diagonal to the second tracking coil,
   wherein said actuator further comprises a magnet system separate from the lens holder and extending substantially beyond the first plane and the second plane, seen from the lens holder, said magnet system cooperating with the tracking coil system and the focusing coil system for effecting a tilt motion
   wherein the focusing coil system lies below the center of gravity of the lens holder,
   wherein the tracking coil system lies substantially at the same level as the center of gravity of the lens holder.

9. The actuator of claim 8, wherein the focusing coil system includes a first focusing coil in the first plane and a second focusing coil system in the second plane, and wherein the first focusing coil is substantially diagonal to the second focusing coil.

10. The actuator of claim 8, wherein the first tracking coil and a first focusing coil form an L configuration in the first plane, and wherein the second tracking coil and a second focusing coil form an ⌋ configuration in the second plane.

11. An optical pick-up actuator comprising a lens holder suspended by suspension means and having tracking and focusing coils and an objective lens, and means for tilting the optical lens holder, wherein the actuator comprises a coil system at a side of the lens holder,
   said coil system comprising a focusing coil system and a tracking coil system, the tracking coil system including a first tracking coil in a first plane and a second tracking coil in a second plane substantially parallel to the first plane, wherein the first tracking coil is substantially diagonal to the second tracking coil,
   the actuator having a magnet system separate from the lens holder and extending substantially beyond the first plane and the second plane, seen from the lens holder, said magnet system cooperating with the tracking and focusing coils, the focusing and tracking coil systems being arranged for effecting tilt through cooperation with the magnet system
   wherein the first tracking coil and a first focusing coil form an L configuration in the first plane, and wherein the second tracking coil and a second focusing coil form an ⌋ configuration in the second plane, wherein the focusing coil system lies below the center of gravity of the lens holder, and wherein the tracking coil system lies substantially at the same level as the center of gravity of the lens holder.

12. The optical pick-up actuator as claimed in claim 11, wherein the tracking and focusing coils act close to the center of gravity.

13. The optical pick-up actuator as claimed in claim 11, wherein magnetic axes of at least some of sub-magnets of the magnet system have a non-perpendicular orientation relative to the first and/or the second plane of the coils.

14. The optical pick-up actuator as claimed in claim 11, wherein a pair of the coils forms the means for tilting the lens holder and forms part of the focusing coil system.

15. An optical read and/or write system comprising an optical pick-up actuator according to claim 11.

16. An actuator comprising:
a lens holder having a tracking coil system and a focusing coil system; and
an objective lens held by the lens holder;
a means for tilting the lens holder;
wherein the tracking coil system includes a first tracking coil in a first plane and a second tracking coil in a second plane substantially parallel to the first plane, and
wherein the first tracking coil and a first focusing coil form an L configuration in the first plane, and wherein the second tracking coil and a second focusing coil form an ⌋ configuration in the second plane, wherein the first tracking coil is substantially diagonal to the second tracking coil, wherein said actuator further comprises a magnet system separate from the lens holder and extending substantially beyond the first plane and the second plane, seen from the lens holder, said magnet system cooperating with the tracking coil system and the focusing coil system for effecting a tilt motion, wherein the focusing coil system lies below the center of gravity of the lens holder, and wherein the tracking coil system lies substantially at the same level as the center of gravity of the lens holder.

17. The actuator as claimed in claim 16, wherein the radial and focus coils act close to the center of gravity.

18. The optical pick-up actuator as claimed in claim 16, wherein magnetic axes of at least some of sub-magnets of the magnet system have a non-perpendicular orientation relative to the first and/or the second plane of the coils.

19. The actuator as claimed in claim 16, wherein a pair of the coils forms the means for tilting the lens holder and forms part of the focusing coil system.

20. The actuator as claimed in claim 16, wherein the tracking and focusing coils act close to the center of gravity.

21. An optical read and/or write system comprising an actuator, according to claim 16.

* * * * *